United States Patent [19]

Flier

[11] 3,940,495

[45] Feb. 24, 1976

[54] PROTEIN PRODUCT AND METHOD FOR FORMING SAME

[75] Inventor: Ronald J. Flier, Ladue, Mo.

[73] Assignee: Ralston Purina Company, St. Louis, Mo.

[22] Filed: Jan. 17, 1973

[21] Appl. No.: 324,295

Related U.S. Application Data

[63] Continuation of Ser. No. 600,471, Dec. 9, 1966, abandoned, which is a continuation-in-part of Ser. No. 381,853, July 10, 1964, abandoned.

[52] U.S. Cl. ............... 426/104; 426/629; 426/632; 426/634; 426/656; 426/448
[51] Int. Cl.$^2$............................................. A23J 3/00
[58] Field of Search ........... 426/141, 147, 148, 445, 426/448, 449, 455, 459, 461, 104, 629, 632, 634, 656

[56] References Cited
UNITED STATES PATENTS

| | | | |
|---|---|---|---|
| 3,119,691 | 1/1964 | Ludington et al. .................... | 426/99 |
| 3,139,342 | 6/1964 | Linskey............................... | 426/293 |
| 3,142,571 | 7/1964 | McAnelly ........................... | 426/141 |
| 3,268,336 | 8/1966 | Hale et al. .......................... | 426/284 |

OTHER PUBLICATIONS

Baer "The V. D. Anderson Co." Division of International Basic Economy Corp., Cleveland, Ohio, Feb. 1959, Food Processing, Sept. 1963.

Primary Examiner—Raymond N. Jones
Attorney, Agent, or Firm—Price, Heneveld, Huizenga & Cooper

[57] ABSTRACT

A method of producing an expanded product which resembles meat, directly from soybean meal itself, including the steps of utilizing soybean meal that has substantially all the fat removed to an amount of about 5% or less, and preferably 2% or less, moistening the soybean meal such as mixing the soybean meal with water to obtain a moisture content of about 20%–40% by weight, controlling the pH within the range of 5 to 12, preferably 6 to 9, preferably adding an edible pH altering electrolyte while maintaining the controlled pH, and then simultaneously, mechanically working, heating above 212° F., and pressurizing the moistened soybean meal in an extruder chamber sufficiently to cause continuous conversion of the meal to a flowable substance, and forcing the substance through and out of restricted orifice means to expand it into a lattice network structure having resilience, body strength, and appearance approaching that of meat.

52 Claims, 1 Drawing Figure

PROTEIN PRODUCT AND METHOD FOR FORMING SAME

CROSS REFERENCE TO RELATED APPLICATIONS

This is a continuation of my copending application entitled PROTEIN PRODUCT AND METHOD AND APPARATUS FOR FORMING SAME, filed Dec. 9, 1966, Ser. No. 600,471, which in turn is a continuation-in-part of my application entitled PROTEIN PRODUCT, filed July 10, 1964, Ser. No. 381,853, both now abandoned.

BACKGROUND OF THE INVENTION

This invention relates to a method and apparatus for producing a meat-simulating product from protein-containing vegetable materials, particularly soybean meal, and to a meat-simulating product produced from protein-containing vegetable materials.

During recent years, extensive research and development efforts have been applied toward the development of meat-like or meat-simulating food materials prepared from protein-containing vegetable substances. As is known, the chief nutritional value of meat is due to its protein content. However, although meat is a most desirable source of protein, from the consideration of eating pleasure, the production of meat is actually relatively inefficient, in terms of feed input to food output. Furthermore, certain crops such as soybeans, provide inexpensive by-products which have a high percentage of potentially available protein, but which are not normally palatable and/or edible.

One excellent technique for producing meat-simulating edible foods from protein-containing vegetable materials such as soybean meal is taught in U.S. Pat. No. 2,682,466 to Boyer, entitled HIGH PROTEIN FOOD PRODUCT AND PROCESS FOR ITS PREPARATION, issued June 29, 1954. This technique involves the creation of a large number of small diameter spun fibers which are then gathered into bundles or "tows," and thence formed into various type edible products with subsequent operations. While these products are of high quality, the process is complex and expensive, so that the products must be priced in the general range of the corresponding actual meat products. Moreover, the product output per expense unit of equipment is relatively small.

Consequently, there has existed a definite need for a relatively inexpensive method of treating protein-containing vegetable materials to produce a product which would bear resemblance to actual meat in appearance, physical structure and texture, and chewing and mouth-feel characteristics, and that could be practiced sufficiently inexpensively that the product could be priced at a small fraction of the price of actual meat products.

It is a primary object of this invention, therefore, to provide a unique relatively inexpensive method of treating protein-containing vegetable materials to convert them from a generally unpalatable substance to a highly palatable and desirable product that is restructured to resemble meat in appearance, physical structure and texture, chewing characteristics, and nutritional value. Further, these properties and characteristics can be controllably varied quite readily by the method.

Another object of this invention is to provide a novel method of producing highly nutritional, highly palatable meat-simulating food products from protein-containing vegetable materials, particularly soybean meal, such that the method is capable of relatively high production, continuous product output per expense unit of equipment. Moreover, the amount of protein in the product can be greatly varied as desired.

Another object of this invention is to provide a novel method of producing from protein-containing vegetable material a meat-simulating product which can be rapidly and inexpensively dried as it is produced, to be capable of conventional packaging for extended unrefrigerated storage in its dry condition. Further, the stored product can be rapidly rehydrated in a matter of seconds, in a very simple manner, without cooking, heating, autoclaving, or steaming, but rather merely by the addition of aqueous liquid.

Another object of this invention is to provide a novel highly palatable, highly nutritional meat-simulating food product from protein-containing vegetable materials, particularly soybean meal, capable of being dried, packaged, shipped, and stored for substantial periods, without refrigeration, and capable of rehydrating in moments merely by the addition of moisture, and without requiring cooking, autoclaving or pressurizing.

Another object of this invention is to provide, from a protein-containing vegetable material, particularly soybean meal, a meat-simulating food which has a fibrous lace network structure appearing and acting somewhat like the muscle fibers in actual meat, but which product costs only a fraction of that of meat.

Another object of this invention is to provide from protein-containing non-meat material, a meat-simulating product capable of inexpensive and rapid dehydration, and of subsequent simple and rapid rehydration, to effect a meat-simulating foodstuff having all the beneficial characteristics of meat but at a cost of about one-fifth of that of meat.

Another object of this invention is to provide novel extrusion apparatus capable of continuously, rapidly, and reliably converting protein-containing vegetable material, particularly soybean meal, into a restructured, excellent quality, meat-simulating product having a fibrous network structure resembling the muscle fiber structure of meat.

These and several other objects of this invention will become apparent upon studying the following specification in conjunction with the drawing.

DETAILED DESCRIPTION

The concept of this invention pertains broadly to a unique processing treatment of protein-containing products to obtain a meat-like food material, the concept being intended for the treatment of protein-containing vegetable materials, with by far the most beneficial results being achieved when the novel concept is applied to soybean meal, in contrast to other vegetable protein materials such as peanut meal, corn meal, and cottonseed meal. In fact, by properly treating soybean meal according to this invention, a top grade, expanded product containing a fibrous network simulating the texture of meat tissues is obtained.

Soybean meal is the product resulting after oil is extracted from comminuted soybeans and is commonly called defatted soybean flakes. Soybean meal usually is in a flake-type particulate form. It could, however, be ground into a finer form such as powder. These various physical sizes and forms are broadly considered with the term soybean meal. In order to practice the present invention, it is important that the oil be extracted by chemical solvent techniques, such as with hexane rather than by mechanical pressing techniques, because the meal fed to the extruder in this process should be substantially free of oil. If mechanical pressing techniques are employed, the chemical solvent technique is subsequently employed before proceeding with the practice of this invention.

Specifically, it has been found that if the soybean meal is substantially free of residual oil, for example about 0.5% or less by weight, very excellent, meat-simulating, fibrous formation occurs during extrusion, as well as the product exhibiting a controlled and excellent rate of expansion as ejected from the extruder. If the residual oil content in the soybean meal is present in a minor amount, e.g., about 2% by weight or less, a usable product can be obtained by the novel process, since some limited fibrous structure forms, but the fibrous structure is poor in comparison with that from substantially oil-free soybean meal. Furthermore, if the residual oil content is much above the minor amount, for example, about 5% by weight of the soybean meal, very little or no fibrous formation occurs. No other vegetable oil or animal oil or fats should be added to the soybean meal prior to extrusion. Either of the terms "oil" or "fat" are used herein to encompass what might be considered as vegetable oils and fats, or animal oil and fats, whether liquid or solid in form.

Another important criterion, which has been determined for the soybean meal composition, is the carbohydrate content. This component has an effect on the amount of product expansion. In this regard, it should be noted that, for an optimum meat-simulating product to be formed, the product must have an interconnected fibrous lace network formation that appears, feels, and acts in some respects like muscular meat fibers. For this to occur, the product should be controllably expanded or puffed when ejected from the extruder. However, the expansion is limited so that it is not unduly puffed. This excessive puffing destroys or at least seriously limits the formation of the interlaced nature of the fibrous product. Regarding this factor, it has been experimentally determined that the carbohydrate content, if present in an amount over a certain minimum, increases the amount of expansion of puffing sufficiently that the fibrous structure is at least partially or completely broken up and destroyed. Specifically, the natural carbohydrate content of about 35% by weight should not be increased by any more than about 5% by weight added carbohydrate. For example, if the carbohydrate content is increased by about 15% by weight added carbohydrate, fibrous formation is normally prevented or destroyed.

Prior to being fed into the extruder, the soybean meal is mixed with a predetermined amount of aqueous liquid, such as plain water, in order to effect a necessary minimum moisture content. The soybean meal and moisture are mixed into a generally homogeneous mass prior to being fed through the extruder. The moisture content can generally vary between the minimum of about 20% by weight of the total mixture to a maximum of about 40% by weight of the total mixture. If the moisture content is varied within this range from the low amount to the high amount, the temperature of the mixture in the meal should be varied as specifically explained below. This moisture assists in the chemical changes that occur in the extruder, is essential to the controlled expansion of the product leaving the extruder, and probably has other functions which are not fully understood. Preferably, the moisture content is between 30%–40% if the sodium hydroxide is not added as explained hereinafter. If it is added, the preferred moisture content is 23%–34%. At any rate, the moisture is an essential component in the soybean meal mixture.

Associated with the moisture addition is the control of the pH of the soybean meal. Control of this pH is also significant in this process. The normal pH of soybean meal after oil extraction is usually within the range of 6 to 7, typically 6.9 or so. Although experimentation has shown that soybean meal of widely varying pH can be beneficially extruded according to this process, it has been determined that the resulting product varies greatly in characteristics and qualilty with variation in pH. Specifically, it has been determined experimentally that is is preferably to have the meal just slightly acidic or slightly basic. That is, it is broadly desirable to keep the pH within the broad range of 5 to 12 since, below 5 and above 12, very poor fibrous formation occurs. Of this broad range, it preferably should be kept within a pH range of 6 to 9. Experimentation over an extended period of time shows that the best fibrous formation occurs when the meal is slightly basic, within a pH range of 7.5 to 8.7.

Control of this pH is achieved by adding a common acid such as hydrochloric acid, phosphoric acid, a base such as sodium hydroxide or other common edible electrolytes, to the aqueous liquid prior to mixing this aqueous liquid with the soybean meal to form the moist mixture. The above-noted experimentation clearly shows that the addition of an hydroxide is particularly beneficial since it apparently has a function in addition to acting as a pH control material. The amount of sodium hydroxide added should be sufficient to raise the pH to about 8.2–8.7, with 8.6 being optimum. It appears to have a beneficial chemical action on the complex protein molecular structure to catalyze the reaction. Whatever the technical explanation, the addition of sodium hydroxide causes a substantially better grade of fibrous formation in the resulting extruded product, and greatly eases control of the process. It further enables the protein content to be varied within a wider range without preventing excellent fibrous formation, as explained hereinafter. If the mixture formed from the aqueous solution of sodium hydroxide and the soybean meal is allowed to set and "cure" for several minutes prior to introduction to the extruder, these beneficial results are even further assured. Hence, control of the pH of the mixture, particularly with hydroxyl ions, is very significant to obtain a top quality product.

Another controlling factor, in addition to the fat content, carbohydrate content, moisture content, and pH of the soybean meal, is the protein content of the composition. Typically, soybean meal resulting from conventional oil extraction processes has a protein content of about 44% or 50% by weight, depending on the degree of refinement. Normally, a protein content of less than about 44% is not encountered, although this process is intended to encompass vegetable materials having a protein content less than this. A typical protein concentrate which can be added to increase the protein is commercially termed "isolated protein". Experimentation with this process shows that a soybean meal with a protein content of about 50% by weight produces the most desirable product, with optimum fibrous network formation and optimum expansion. Hence, preferably the operation is conducted on this material. However, the method does produce some fibrous formation in soybean meals having a protein content of about 30%, but below this value, the product is not very worthwhile. Furthermore, the protein content can be increased substantially about 50%, up to about 75%. Above this, the resulting product tends to have a gummy characteristic which is not desirable. Hence, preferably the protein content in the soybean meal should be between about 30% and 75% by weight, with the preferred amount being about 50% by weight.

The addition of a hydroxide, preferably sodium hydroxide, has a definite effect on the usable range of protein concentration which can be employed while operating with a minimum of production problems and producing a highly desirable product.

Figure 1:
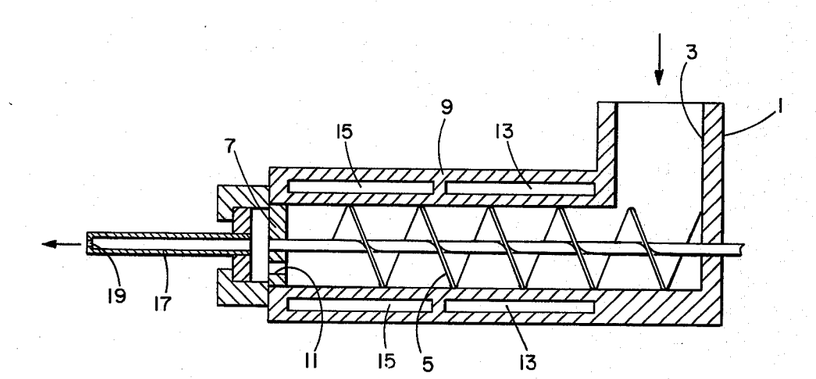
The drawing is a side elevational, sectional view of the basic extrusion apparatus preferred for practicing the invention.

When a soybean mixture having the characteristics described above has been prepared, it is fed into an extruder assembly where it is subjected to elevated temperature and pressure and the extruder, as illustrated, is equipped with a restrainer plate 7. The rotating screw 5, in combination with this restrainer plate with its restricted outlet 11, creates a high pressure on the material in the extruder. The particulate, moist meal fed in changes form until it finally flows in a generally fluid manner even squeezing around the outer periphery of the screw in a recirculating fashion, to cause a severe mechanical working of the substance. The pressures in the extruder are elevated to several hundred psi, and normally fall within the range of about 300–600 psig. Part of the pressure is caused by the screw and restrainer plate. Part of the pressure is due to the high temperatures which result both from friction between the flowing product and components of the extruder, and from heat that is purposely added to the outside of the extruder in normal operation. This added heat is preferably obtained by passing steam through the forward or front annular jacket 15 within the extruder housing, around, but separated from, the forward end of the extruder chamber. The amount of steam heat applied is controlled by typical valving techniques in a manner to obtain temperatures which are not sufficiently high as to cause the product to scorch or burn, but which are sufficiently high to cause the desired chemical and physical reactions within the material. The amount of added heat to do this will vary with the particular extruder construction, but can be readily determined by trial and error during the initial stages of operation of the equipment.

The temperatures reached by the material in the extruder must be above 212° F. and actually should be considerably higher, within a certain specific range in order for a meat-simulating product with good fibrous structure to be formed. This varies with variations of the other mixture characteristics of which the most significant is moisture content. As the moisture content increases from about 20% to about 40%, the temperature may be decreased from about 310° F. to about 270° F. Below about 270° F., fibrous formation is poor. The preferred temperature range is about 270°–300° F., with optimum results having been obtained at about 280° F.

In addition to the steam jacket for adding heat, an annular cooling jacket 13 surrounds the rear portion of the extruder chamber. This has been found desirable in normal operation to maintain lower temperatures in the initial stages of mechanical working in the extruder. Cooling prevents the product from overheating to become scorched before it exits from the extruder. Again, the amount of cooling water and the temperature to cause the desired cooling effect will vary, but can be readily determined by trial and error during initial stages of operation.

The product outlet means from the extruder also includes a smaller secondary chamber into which the material discharges from orifice 11. The output from this second smaller chamber is also restricted by a die nozzle outlet 19. It has an area smaller than or about that of the restrainer or restrictor outlet 11. Without this two-stage restriction set up, it is extremely difficult to obtain acceptable fibrous formation in the product. In fact, another feature of the extruder has been found to be important to top quality fibrous formation when employing the cooperative makeup explained previously. This feature is the positioning of an elongated pipe member 17 between restrictor outlet 11 and die outlet 19. It has a diameter substantially smaller than the diameter of the extruder chamber to which it is attached, such diameter ratios normally being about 1/6 to 1/10. The product is longitudinally passed through this member while still radially restricted, along the length of the tube, under high pressures and at the elevated temperatures prior to being ejected into the lower pressure and temperature of the atmosphere. The tube has a length of about 8 to 12 times its internal diameter. In actual dimensions, a representative example of these components would include an extruder chamber diameter of about 5 inches, with a length of 3 to 4 feet or so, and a tube diameter of ¾ of an inch and length of about 6 inches.

The exact scientific explanation of the functions of this hollow pressure tube into which the material is ejected prior to ejection to the atmosphere, cannot be given; but the efficacy of it is very definite and significant. In fact, with some soybean meals where the protein content is low, only very poor fibrous formation occurs unless this tube extension is employed.

OPERATION

In operation, the soybean meal obtained by solvent extraction of oil from the soybeans is checked so that it has only a minor oil content, i.e., less than about 2%, and preferably is substantially oilfree, i.e., less than about 0.5% by weight of the meal. If the content is greater than this, the soybean meal must be treated with a chemical solvent such as hexane to extract the excess oil. Further, no other oil or fat material, animal or vegetable, is added to the meal prior to extrusion.

If desired, the meal may be ground more finely than the small flakes in which it normally occurs from the extraction process, but experimentation along this line indicates that this is not necessary.

Moisture is then added to the soybean meal, normally in the form of water, to bring the moisture content within the range of 20% to 40% by weight of the resulting mixture. The moisture and meal are mixed into a homogeneous mixture.

If the pH of the meal is to be adjusted, for example, to place it in the preferred range of 7.5 to 8.7, it is adjusted by adding the noted type of reagents, preferably. A basic material containing hydroxyl ions, preferably sodium hydroxide can be added by adding it to the water prior to moistening the meal. Enough is preferably added to bring the pH to about 8.6. If it is desired to adjust the pH into the acidic range, acid is added to the water and thus to the meal in the same fashion.

When the mixture is prepared and ready for the extrusion operation, it is fed into inlet 3 while the extruder screw 5 is rotated at a substantial speed, for example of about 150 rpm. During this operation, steam is passed through forward jacket 15, and normally, cooling water is passed through rear jacket 13. The meal mixture is advanced in the extruder by the screw while its temperature is increased to within the range of 270°–310° F. by the steam heat added, by the mechanical working friction, and possibly by the chemical changes occuring. Since the screw tends to advance the material faster than it can be passed through the restricted outlet means, the pressure builds up in the chamber to several hundred pounds per square inch, usually about 300–600 psi, while the product is severely mechanically worked in the extruder. By the time the mixture reaches the restrictor plate, it is in the form of a flowable substance which is forced from the main extrusion chamber, after a retention time of usually 30–40 seconds, through restrictor plate outlet 11 into the supplemental chamber. The material remains under elevated pressures and temperatures as it is advanced by pressure differential through the secondary chamber through the elongated tube, to die outlet means 19. As it emerges from outlet 19 under the high internal pressures into the much lower atmospheric pressure, the super heated moisture paritally flashes off by evaporation to cause product expansion and partial cooling. If the product is being processed properly, it emerges in the form of a continuous, elongated, expanded, fibrous member which is restructured and which can be kept in its continuous form or severed into individual chunks as it emerges by any ordinary cut-off means. The expanded product is very porous, and has a fibrous network or lace structure which somewhat resembles that of actual meat tissue fibers. If the product is kept moist in its freshly extruded condition, it can be directly used for simulated meat. Normally, it is desirable to add coloring materials to the product before extrusion, and to add flavorings before or after extrusion. The product is very nutritious as it emerges, is sterile, palatable, and wholesome. If portions of the product are pulled apart with one's fingers, the texture appears and acts somewhat like that of meat.

Instead of storing the product in its moist condition, wherein it should be kept under refrigeration or in hermetically sealed condition, it can be easily and quickly dried merely by passing it through a conventional drying chamber so that it can be packed and stored in a more convenient fashion. Its porosity enables it to dry quickly enabling simple and direct packaging in its dried form in a manner similar to cereal products. An important feature of this product is that it can be completely rehydrated extremely rapidly, i.e., in a few seconds, with great ease, i.e., merely by adding an aqueous liquid. Thus, whenever it is to be eaten, the dried chunks are rehydrated by mixing with aqueous liquid such as pure water, which is preferably warm so that it would be at a desirable eating temperature. The rehydrated product exhibits all of the desirable noted meat-simulating characteristics. No cooking, autoclaving, or pressurizing is necessary for rehydration.

The resulting product can be used for human food, e.g., "health foods", or, due to its cost being only about 1/5 or less of that of conventional meat, it can be economically used for pet foods. Palatability and nutrition tests have proven it to be an excellent and desirable food for pets or other animals. The material can be employed in a variety of forms, can be colored and/or flavored in a variety of fashions, and can be controllably varied in characteristics, to resemble various types of meat materials. By controlling the rate of feed of the product through the extruder, temperatures, degree of expansion, additives, protein content, moisture content, and the like, the character of the product can be widely varied while retaining its fibrous meat-simulating texture. The possibilities of this food product are many.

To assure that one having ordinary skill in the art will understand this invention, the following detailed illustrations are provided. It will be realized that literally thousands of various experimental runs have been made after discovery of the basic invention involved, over an extensive period of time. These were done in order to determine the critical limitations of the composition and method steps, and the operational criteria. To record the data of all of these runs here would unduly lengthen this document and would serve no good purpose.

ILLUSTRATION 1

Seventeen pounds of soybean meal, after oil extraction by hexane were employed. It had a protein content of 50% by weight of the soybean meal, and a fat content of 0.5% by weight. This soybean meal was mixed with 2600 cc. of water, having sufficient sodium hydroxide added to the water to cause the mixture of moisture and soybean meal to have a final pH of 7.5. The mixture was allowed to set and cure for 5 minutes to obtain a good water and sodium hydroxide dispersion, penetration, and reaction. The mixture was then fed into the extrusion device illustrated, with steam being supplied to jacket 15 at a pressure of 20 psig and cooling water at room temperature being constantly passed through jacket 13. The opening in restraining plate 7 was ¼ inch in diameter, with screw 5 being rotated at 150 rpm. The mixture was thus mechanically worked within the extruder at a temperature of around 300° F., with the pressures varying somewhat but being generally above 300 psig. The material was continuously passed through the extruder, passing through the elongated tube and out an extruder nozzle having a size of ⅜ × ⅛ inch. The reaction time of the material within the extruder was about 30 seconds. The mixture was ejected from the nozzle in a continuous stream, and was a coherent fibrous structure which expanded with passage through the nozzle, to form a porous structure. The product, when removed, had a fibrous meat-like texture of excellent quality.

ILLUSTRATION 2

Another run similar to Illustration No. 1 was made, but in this instance the pH was adjusted to the acidic side with hydrochloric acid with the soybean meal being mixed with 1,000 cc. of water to which 15.5 grams of concentrated hydrochloric acid had been dissolved. The materials were mixed for approximately 13 minutes, and then an additional 1,850 cc. of water were added, with the resulting pH of the mixture being approximately 6.6. The mixture was then fed to the extruder, and passed through the extruder at pressures generally of about 400 psig and at a temperature of about 300° F. The resulting product had good fibrous formation, but inferior to the fibrous formation of Illustration No. 1, when the pH was on the basic side.

ILLUSTRATION 3

This operation was just like that in Illustration No. 1 above, except that the moisture content was about 25% and the pH was not adjusted. The product was completely acceptable, and the fibrous formation was good but not as good as when the pH was above 7.

ILLUSTRATION 4

The meal was substantially the same as that used in Illustration No. 2, but the pH was adjusted in the mixture to 5.5 by adding 52 grams of hydrochloric acid in solution in 2,300 cc. of water. Although fibrous portions did form, they did not bind the product together in the effective manner of previous runs, and fibrous formation was less than previously. In additional experiments, it appeared that the rate of fibrous formation tended to fall off quite rapidly as the pH is lowered below this amount.

ILLUSTRATION 5

In this illustrative run, the soybean meal was of the type described in Illustration No. 1. The mixture, however, was formed by adding 50 grams of sodium hydroxide and approximately 1,000 cc. of water were mixed with the soybean meal to obtain a resulting mixture pH of 8.6, after 1,300 cc. of additional water was subsequently added. The product was then extruded through the equipment illustrated, with the ultimate product exhibiting very substantial puffingg puffing but yet with complete coherence by reason of the fibrous network, and with excellent meat-simulating characteristics. It dried quickly and easily at temperatures above 212° F. to evaporate excess moisture. It rehydrated within a few seconds merely by adding warm water.

ILLUSTRATION 6

Parallel runs were made on soybean meals containing approximately 2% soybean oil, 2% animal fat, and 5% soybean oil in the meal. Seventeen pounds of the 50% protein soybean meal was mixed with 2,300 cc. of water in each instance and 7.5 grams of sodium hydroxide to bring the pH within the range of just above 7, but under 8. The meal was then extruded through the equipment as previously, with the result being that the product from the meal containing 2% soybean oil and the product from the meal containing the 2% animal fat exhibited some fibrous formation but of a generally poorer quality, while that containing the 5% soybean oil exhibited no fibrous formation at all. In fact, in this latter instance, the particulate meal was discharged in much the same form in which it went into the extruder.

ILLUSTRATION 7

Parallel runs were made on the 50% protein soybean meal containing 5% carbohydrate and 15% carbohydrate in the form of corn starch. The resulting products included a product of the 5% mixture which had poor fibrous formation, with excessive puffing breaking up the fibrous network and the 15% product having only puffing with no fibrous formation occurring so that it did not have meat-simulating characteristics.

ILLUSTRATION 8

Parallel experiments employing protein contents of 44% and below, run at various pH levels, at varying extruder temperatures and pressures exhibited differing types of fibrous formation. Experiments with and without the extruder tube extension were made.

As stated previously, the number of illustrations could be endlessly listed, but it is believed that, with the above illustrations and discussion of the criteria and critical factors involved, anyone having ordinary skill in this art could adapt the novel method and apparatus to various situations to obtain the desired type of product merely by a few trial-and-error variations in the moisture content, pH, fat or oil content, carbohydrate content, extrusion pressures and temperatures, restrainer plate restrictions, extrusion die nozzle sizes, and the like. In fact, it is realized that variations in these and related factors could be readily made within the concept taught herein. Hence, the invention is intended to be limited only by the scope of the appended claims and the reasonably equivalent methods, apparatuses, and products to those defined therein.

The embodiments of the invention in which an exclusive property or privilege is claimed are defined as follows:

1. A method of treating a protein-containing vegetable material having no more than a minor amount of fat and a protein content of at least about that of solvent-extracted soybean meal to form a porous fibrous food product comprising the steps of: moistening the protein-containing vegetable material to a moisture content of at least about 20% by weight and maintaining the pH of the mixture in a range which is slightly above or slightly below the neutral point of the vegetable material; mechanically working the moistened protein-containing vegetable material under temperatures in excess of 212°F. and elevated pressures; forcing the heated, pressurized, mechanically worked material through first restricted orifice means, maintaining the material under elevated temperatures and pressures as it emerges from said first restricted orifice means; the heat, pressure and mechanical working of the material prior to passage through said first restricted orifice means and the heat and pressure applied to said material after passage through said first restricted orifice means being such that upon release of the pressure it has the capability of forming a fibrous structure and then extruding the material through second restricted orifice means into an environment of a pressure substantially lower than said elevated pressures causing expansion of the product with moisture evaporation and the formation of a puffed and fibrous meat-like structure.

2. The method of treating a protein-containing vegetable material recited in claim 1 wherein the protein-containing vegetable material is soybean meal having a fat content of approximately 0.5%.

3. The method of treating a protein-containing vegetable material recited in claim 1 wherein an edible electrolyte is added to the material to adjust the pH of the material into said range of slightly acidic to slightly basic.

4. The method of treating a protein-containing vegetable material recited in claim 3 wherein said edible electrolyte is a hydroxyl ion containing water-soluble reagent.

5. The method of treating a protein-containing vegetable material recited in claim 4 wherein the edible electrolyte is sodium hydroxide.

6. The method of treating a protein-containing vegetable material recited in claim 5 wherein the solution and said vegetable material are allowed to set and cure for several minutes prior to application of said mechanical working.

7. The method of converting vegetable material in claim 1 wherein said elevated pressure is within the general range of 300 to 600 psi.

8. A method of converting soybean meal into a fibrous meat-simulating product, comprising the steps of: providing a soybean meal having a protein content of at least about 50% and a fat content of no more than a minor amount; moistening the meal to a moisture content of at least about 20% by weight; controlling the pH of the meal to a value between approximately 5 and 8; mechanically working the moistened soybean meal while simultaneously heating it to a temperature of at least about 212° F. and also applying an elevated pressure thereto to change the material to one capable of forming a fibrous structure upon release of the pressure; and then extruding the material through restricted orifice means into an environment of a pressure substantially lower than said elevated pressure to form an expanded material having a fibrous structure.

9. The method of converting soybean meal recited in claim 8 wherein said material is expanded in stages by extruding the material through first restricted orifice means into a chamber within which it is maintained under elevated temperature and pressure, and then through second restricted orifice means into said substantially lower pressure environment.

10. A method of forming a porous fibrous food product from a predominantly protein containing vegetable material wherein said material has a fat content of no more than a minor amount comprising the steps of: providing said protein-containing vegetable material having a protein content of at least about that of solvent-extracted soybean meal; adjusting the moisture content of said vegetable material to a content of at least about 25% by weight; mechanically working the moistened protein-containing vegetable material under temperatures in excess of 212°F. and elevated pressures; forcing the heated, pressurized, mechanically worked material through first restricted orifice means, into an elongated zone of confinement while maintaining the material in confinement under elevated temperatures and pressures; advancing the material through said elongated zone of confinement for a period of time sufficient to cause the material to have a fibrous nature as it is finally discharged; and then discharging the material by extruding it through second restricted orifice means into an environment of a pressure substantially lower than said elevated pressures, causing expansion of the product with moisture evaporation and the formation of meat-simulating fiber structure.

11. A method of forming a fibrous food product from a predominantly protein containing vegetable material, wherein said material has a fat content of no more than a minor amount, comprising the steps of: providing said protein-containing vegetable material having a protein content of at least about that of solvent-extracted soybean meal; adjusting the moisture content of said vegetable material to a content of at least about 25% by weight; mechanically working the moistened protein-containing vegetable material under temperatures substantially above 212°F. and elevated pressures; forcing the heated, pressurized, mechanically worked material through first restricted orifice means into an elongated zone of confinement while maintaining the material in confinement under elevated temperatures and pressures; advancing the material through said elongated zone of confinement for a period of time sufficient to cause the material to have a fibrous nature as it is finally discharged; and then discharging the material by extruding it thorugh second restricted orifice means into an environment of a pressure substantially lower than said elevated pressures, causing expansion of the product with moisture evaporation and resulting in the formation of meat-simulating fiber structure.

12. The method of treating the protein-containing vegetable material recited in claim 11 wherein said protein-containing vegetable material is soybean meal.

13. The method of treating the protein-containing vegetable material recited in claima 11 wherein the porous food product is severed into chunks.

14. A method of forming a fibrous food product from a predominantly protein containing vegetable material wherein said material has a fat content of no more than a minor amount, comprising the steps of: providing said protein-containing vegetable material having a protein content of at least about that of solvent-extracted soybean meal; adjusting the moisture content of said material to between about 20% and about 40% by weight; passing said moistened protein-containing vegetable material through a pair of zones of confinement under temperatures substantially in excess of 212°F. and elevated pressures and mechanically working said material in the first of said zones and separating said zones by a restricted orifice, the heat, pressure and mechanical working applied to said material being such as to convert said material to one capable of forming a fibrous structure upon release of the elevated pressure, discharging said material from the second of said zones through a restricted orifice into an environment of a substantially lower pressure to produce a puffed product characterized by a fibrous structure.

15. The method of forming a food product by restructuring a predominantly protein-containing vegetable material wherein said material has no more than a minor amount of fat comprising the steps of providing said proteinaceous vegetable material having a protein content of at least about that of solvent-extracted soybean meal and mixing said material with sufficient water to provide a mixture having an added moisture content of at least 25% by weight; confining the mixture within an extruder and increasing the pressure and also increasing the temperature of the mixture to substantially above 212°F. while subjecting it to mechanical working until the mixture, upon release of the pressure, is capable of becoming a fibrous structure; forcing the mechanically worked, heated mixture under pressure through a restricted orifice, upon discharge from which the pressure is suddenly released, whereby the mixture is restructured into a puffed product of reduced density having a meat-like texture.

16. The method of restructuring the proteinaceous vegetable material as recited in claim 15 wherein the material while in the extruder is passed through two zones of confinement connected by a restricted passage and said restricted orifice is at one end of the second of said zones.

17. The method of restructuring the proteinaceous vegetable material as recited in claim 16 wherein the mechanical working of said material is applied by a screw in the first of said zones.

18. The method of restructuring a soybean material to form a food product from a predominatly solvent-extracted soybean material, comprising the steps of mixing said solvent-extracted soybean material having a protein content at least about that of solvent-extracted soybean meal with sufficient water to permit the resulting mixture to be passed through an extruder; confining the mixture within an extruder and increasing the pressure and temperature of the mixture while subjecting it to mechanical working until the mixture, upon release of the pressure, is capable of becoming a fibrous structure, said temperature during said mechanical working being increased substantially above 212°F.; and forcing the mechanically worked, heated mixture under pressure through a restricted orifice, upon discharge from which the pressure is released, whereby the mixture is restructured into a puffed product of reduced density having a meat-like texture.

19. The method of restructurihg the soybean material recited in claim 18 wherein the quantity of added water is in the range of 20%–30% of the mixture.

20. The method of restructuring the soybean material recited in claim 18 wherein the quantity of added water is approximately 25% of the mixture.

21. The method of restructuring the soybean material recited in claim 18 wherein the pH of the mixture is adjusted to be within the range of slightly acidic to slightly basic.

22. The method of restructuring the soybean material recited in claim 18 wherein the mixture has a pH in the range of 5–8.

23. The method of restructuring the soybean material recited in claim 18 wherein the mixture has a pH in the range of 6.6–8.0.

24. The method of restructuring the soybean material recited in claim 22 wherein an edible electrolyte is added to the mixture to control the pH.

25. The method of restructuring the soybean material recited in claim 18 wherein the temperature of the mixture is increased to a range substantially above 212°F.

26. The method of restructuring the soybean material recited in claim 18 wherein the pressure applied to the mixture is in the range of 300–600 psi.

27. The method of restructuring a solvent-extracted soybean meal to form a food product comprising the steps of mixing the soybean meal with water, the added water being in the range of 20–30% of the resulting mixture; maintaining the pH of the mixture in a range which is slightly above or slightly below the neutral point of soybean meal; introducing the mixture into a confined chamber and increasing the pressure on the mixture into the range of 300–600 psi and increasing the temperature of the mixture into the range of 212°–310°F.; mechanically working the mixture in the confined chamber until the mixture, upon release of the pressure, is capable of becoming a fibrous structure; forcing the mechanically worked, heated mixture under pressure through a restricted orifice upon discharge from which the pressure is released whereby the mixture is restructured into a puffed product of reduced density having a meat-like texture.

28. The method of restructuring a solvent-extracted soybean meal to form a food product comprising the steps of adding water to the solvent-extracted soybean meal, the added water being in the range of 20–30% of the resulting mixture; maintaining the pH of the mixture in a range which is slightly above or slightly below the neutral point of the soybean meal; introducing the mixture into a confined chamber and increasing the pressure on the mixture into the range of 300–600 psi and increasing the temperature of the mixture into a range substantially above 212°F.; mechanically working the mixture in the confined chamber until the mixture, upon release of the pressure, is capable of becoming a fibrous structure; forcing the mechanically worked, heated mixture under pressure through a pair of spaced restricted orifices upon discharge from the second of which orifices the pressure is suddenly released, whereby the mixture is restructured into a puffed product of reduced density having a meat-like texture.

29. The method of restructuring a predominantly soybean material consisting of discrete particles of soybean from which the oil has been removed by solvent extraction to form a food product comprising the steps of mixing the material with sufficient water that the resulting mixture has about 20% to about 40% moisture by weight; confining the mixture within an extruder and increasing the temperature of the mixture to substantially above 212°F. and also increasing the pressure while subjecting it to mechanical working until the mixture, upon release of the pressure, is capable of becoming a fibrous structure; forcing the mechanically worked, heated mixture under pressure through a restricted orifice upon discharge from which the pressure is suddenly released, whereby the mixture is restructured into a puffed product of reduced density having a meat-like texture.

30. The method of restructuring the soybean material as recited in claim 29 wherein the material while in the extruder is passed through two zones of confinement connected by a restricted passage and said restricted orifice is at one end of the second of said zones.

31. The method of restructuring the soybean material as recited in claim 30 wherein the mechanical working of said material is applied by a screw in the first of said zones.

32. A food product of restructured predominantly protein-containing vegetable material made by the method in claim 15.

33. A food product of restructured predominantly protein-containing vegetable material made by the method in claim 29.

34. A method of producing a porous expanded food product having meat simulating textural characteristics, from a protein-containing vegetable material comprising, the steps of: providing a protein-containing vegetable material of the group consisting of soybean meal, cotton seed meal, and peanut meal, having a fat content of no more than a minor amount and a protein content between about 30% and 75% by weight; moistening such material to a moisture content between about 20% and 40% by weight; controlling the pH of the meal to a value between about 5 and 12; mechanically working the moistened protein-containing vegetable material while simultaneously applying elevated pressures thereto and also heating it to elevated temperatures above 212° F. for a time period sufficient to convert said meal into a flowable substance; and then extruding the heated, pressurized, mechanically worked material through restricted orifice means into an environment of a substantially lower pressure, causing expansion of the material and formation of an expanded network structure therein having textural, chewing and mouth feel characteristics similar to those of meat.

35. A method of treating a protein-containing vegetable material to form a porous palatable and nutritious food product that bears resemblance to meat in appearance, physical structure and texture, and chewing characteristics, comprising the steps of: providing a protein-containing vegetable material of the group consisting of soybean meal, peanut meal, and cotton seed meal, having a fat content of no more than a minor amount and a protein content between about 30% and 75% by weight; moistening such material to a moisture content between about 20% and 40% by weight; controlling the pH of the material to a value between 5 and 12; mechanically working the moistened protein-containing vegetable material while simultaneously heating it to elevated temperatures above 212° F. and also applying elevated pressures for a time period sufficient to convert said meal into a flowable substance; then forcing the heated, pressurized, mechanically worked material through first restricted orifice means, maintaining the material under elevated temperatures and pressures as it emerges from said first restricted orifice means; and then extruding the material through second restricted orifice means into an environment of a pressure substantially lower than said elevated pressures causing expansion of the product with moisture evaporation and the formation of meat simulating structure having textural, chewing and mouth feel characteristics similar to those of meat.

36. A method of converting a protein containing material into a palatable and nutritious product that bears resemblance to meat in appearance, physical structure and texture, and chewing characteristics, comprising the steps of: providing a material from the group consisting of soybean meal, peanut meal, and cotton sead meal, having a protein content of between about 30% and 75% by weight, and a fat content of no more than a minor amount; moistening the meal to a moisture content of at least about 20% by weight but less than about 40% by weight, and also adding to the meal a pH altering edible electrolyte while controlling the pH of the meal to a value between 5 and 12; mechanically working the moistened soybean meal while simultaneously heating it to a temperature of at least above 212° F. for a period of time sufficient to convert said meal into a flowable substance while also applying an elevated pressure thereto; and then extruding the mechanically worked, heated, and pressurized material through restricted orifice means into an environment of a pressure substantially lower than said elevated pressure to expand the material into a porous structure having textural, chewing and mouth feel characteristics similar to those of meat.

37. The method of claim 36 wherein the pH is between 6 and 9.

38. The method in claim 37 wherein said pH is adjusted to a value within the range of about 7.5 to 8.7.

39. The method in claim 37 wherein said material is expanded in stages by extruding the material through first restricted orifice means into a chamber under elevated temperature and pressure, and then through second restricted orifice means into said substantially lower pressure environment.

40. The method in claim 38 wherein said pH of 7.5–8.7 is obtained by adding, as said pH altering edible electrolyte, a hydroxyl ion containing water soluble reagent to water to form a solution, which is then added to the meal for the said moistening step.

41. The method in claim 40 wherein said reagent is sodium hydroxide, and said solution and meal are allowed to set and cure for several minutes prior to said mechanical working step.

42. The method in claim 36 wherein said elevated temperature is within the range of about 270°–310° F.

43. The method in claim 41 wherein said elevated temperature is about 280°F.

44. The method in claim 36 wherein said soybean meal is substantially free of oil.

45. The method in claim 36 wherein said soybean meal has less than about 5% added carbohydrate content by weight.

46. The method in claim 36 wherein said elevated pressure is within the general range of 300 to 600 psi.

47. A method of converting soybean meal into a palatable and nutritious meat simulating product comprising the steps of: providing soybean meal having about 2% or less by weight of oil or fat, a protein content between about 30% and 75% by weight, and an added carbohydrate content less than about 5% by weight; controlling the pH of the meal to a value between 6 and 9; adding moisture to the meal to form a mixture having a moisture content of about 20%–40% by weight of the mixture; mechanically working the mixture while simultaneously applying elevated pressures and also heating it to elevated temperatures within the range of about 270°–310° F. for a time sufficient to convert it to a flowable substance; and then immediately extruding said flowable substance through restricted orifice means into an environment of substantially lower pressure, causing expansion of the substance and formation of a lace network formation in the product having textural, chewing and mouth feel characteristics similar to those of meat.

48. The method in claim 35 wherein, after said material is forced through said first restricted orifice means, it is forced into and through an elongated zone of confinement while maintaining the material in confinement under said elevated temperatures and pressures; and then is extruded through said second restricted orifice means.

49. The method in claim 48 wherein said protein-containing vegetable material is soybean meal.

50. The method in claim 34 wherein the porous food product is formed into chunks with a tearing action to elongate the expanded material.

51. A meat simulated food product formed by the method in claim 35.

52. A meat simulated food product formed by the method in claim 51.

* * * * *

UNITED STATES PATENT AND TRADEMARK OFFICE
CERTIFICATE OF CORRECTION

PATENT NO. : 3 940 495
DATED : February 24, 1976
INVENTOR(S) : Ronald J. Flier

It is certified that error appears in the above-identified patent and that said Letters Patent are hereby corrected as shown below:

Column 2, Line 34:
    "material" should be --- materials ---.
Column 3, Line 52:
    "of" (2nd occurrence) should be --- or ---.
Column 5, Line 13:
    "about" should be --- above ---.
Column 8, Line 55:
    "reaction" should be --- retention ---.
Column 9, Line 39:
    "puffingg" should be --- puffing ---.
    "puffing" (2nd occurrence) should be --- action ---.
Column 11, Line 23:
    "about" should be --- above ---.
Column 12, Line 21:
    "claima" should be --- claim ---.
Column 13, Line 23, Claim 19:
    "restructurihg" should be --- restructuring ---.
Column 16, Line 1, Claim 39:
    "37" should be --- 36 ---.
Column 16, Line 18, Claim 43:
    "41" should be --- 42 ---.
Column 16, Line 60, Claim 51:
    "35" should be --- 34 ---.
Column 16, Line 62, Claim 52:
    "51" should be --- 50 ---.

Signed and Sealed this

Twenty-sixth Day of October 1976

[SEAL]

Attest:

RUTH C. MASON
*Attesting Officer*

C. MARSHALL DANN
*Commissioner of Patents and Trademarks*